(12) United States Patent
Pikna

(10) Patent No.: US 6,491,072 B2
(45) Date of Patent: Dec. 10, 2002

(54) DUPLICATOR DEVICE FOR RADIAL ARM SAW

(76) Inventor: Richard G. Pikna, 4512 Tabor Ridge Rd., NE., Mineral City, OH (US) 44656

( * ) Notice: Subject to any disclaimer, the term of this patent is extended or adjusted under 35 U.S.C. 154(b) by 0 days.

(21) Appl. No.: 10/008,274

(22) Filed: Nov. 8, 2001

(65) Prior Publication Data

US 2002/0053371 A1 May 9, 2002

Related U.S. Application Data

(60) Provisional application No. 60/247,137, filed on Nov. 9, 2000.

(51) Int. Cl.$^7$ ................................................. B27C 5/00
(52) U.S. Cl. ................ 144/144.41; 144/137; 144/144.1; 144/371; 409/89; 409/92
(58) Field of Search ......................... 144/144.1, 144.41, 144/149, 152, 137, 138, 48.6, 2.1, 372; 409/89, 92, 103, 121, 125; 142/7

(56) References Cited

U.S. PATENT DOCUMENTS

| | | | |
|---|---|---|---|
| 3,211,061 A | * | 10/1965 | Cretsinger ................ 144/144.1 |
| 3,299,779 A | * | 1/1967 | Wolf ........................... 409/89 |
| 3,581,622 A | * | 6/1971 | Maass ......................... 409/89 |
| 3,739,824 A | | 6/1973 | Hoenig |
| 4,000,766 A | | 1/1977 | Sutcliffe |
| 4,288,185 A | * | 9/1981 | Lenz ..................... 144/144.1 X |
| 4,312,391 A | | 1/1982 | Snow |
| 4,364,695 A | * | 12/1982 | Lenz ..................... 144/144.1 X |
| 4,397,342 A | | 8/1983 | North |
| 4,454,898 A | | 6/1984 | Pavnica |
| 4,627,772 A | | 12/1986 | Petersen |
| 5,287,900 A | | 2/1994 | Falco |

* cited by examiner

Primary Examiner—W. Donald Bray
(74) Attorney, Agent, or Firm—Sand & Sebolt

(57) ABSTRACT

The invention provides a woodworking duplicator which is adapted to be attached to a standard radial arm saw. The device allows a rotating cutting tool and a stylus to be movably supported allowing the user to trace a pattern with the stylus while cutting the pattern into a work piece with the cutter. The invention provides a duplicator that may be mounted to a radial arm saw wherein the duplicator includes elements that may be moved in five different directions. The invention also provides a duplicator having a stylus and a cutter that may be easily locked into different parallel positions so that the user of the duplicator may more easily trace the item being duplicated. The invention also provides a duplicator that supports the weight of the stylus and cutter tool.

16 Claims, 17 Drawing Sheets

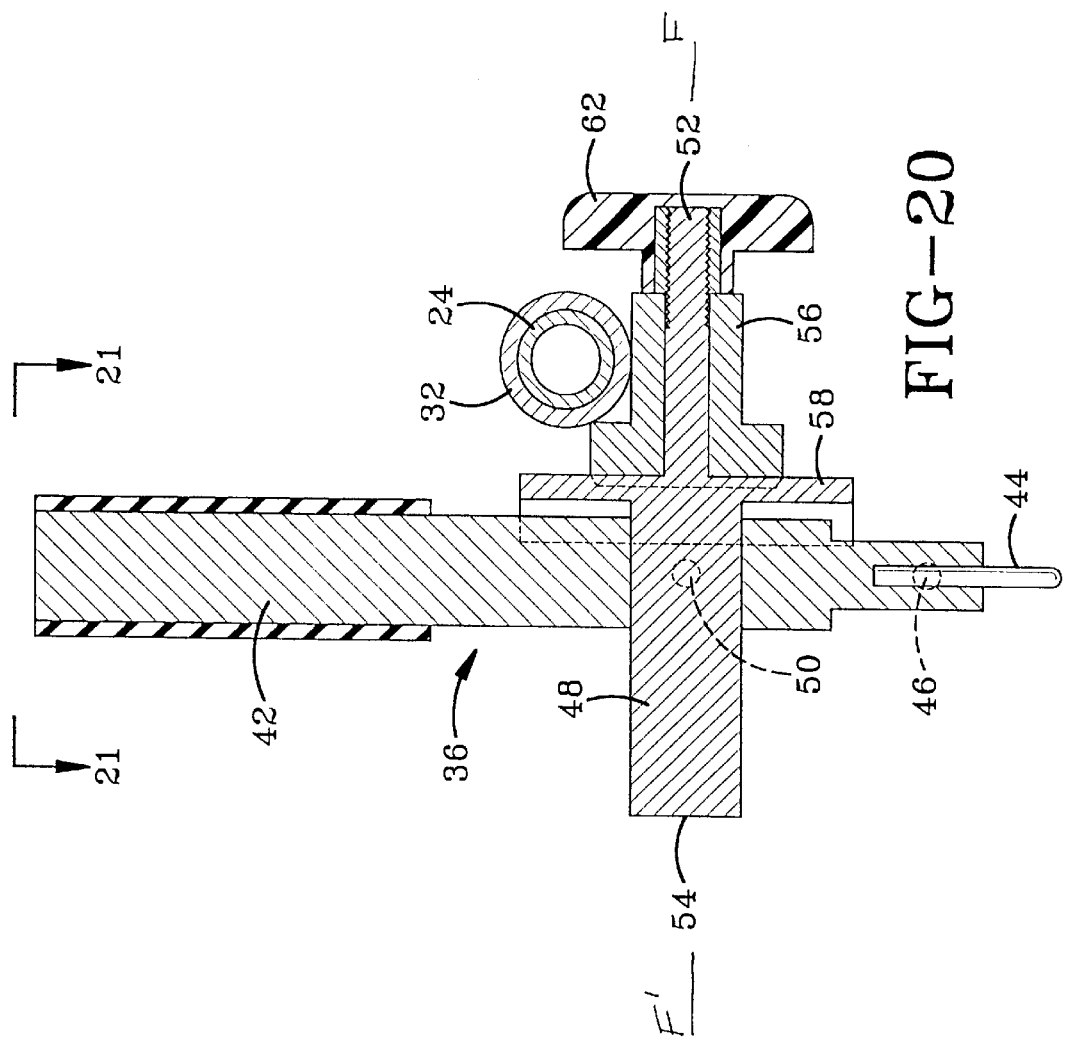
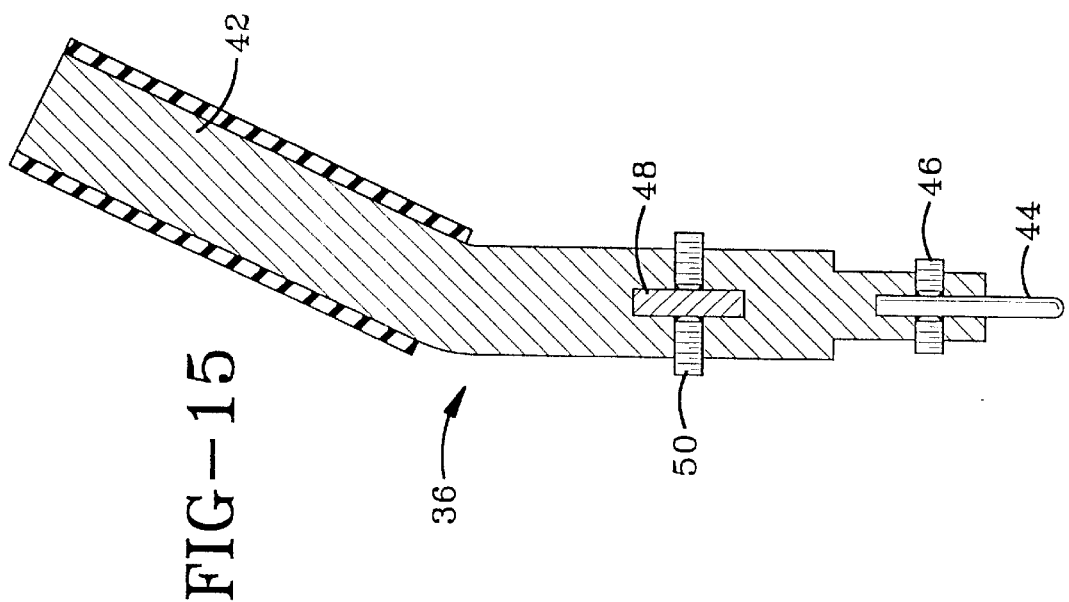

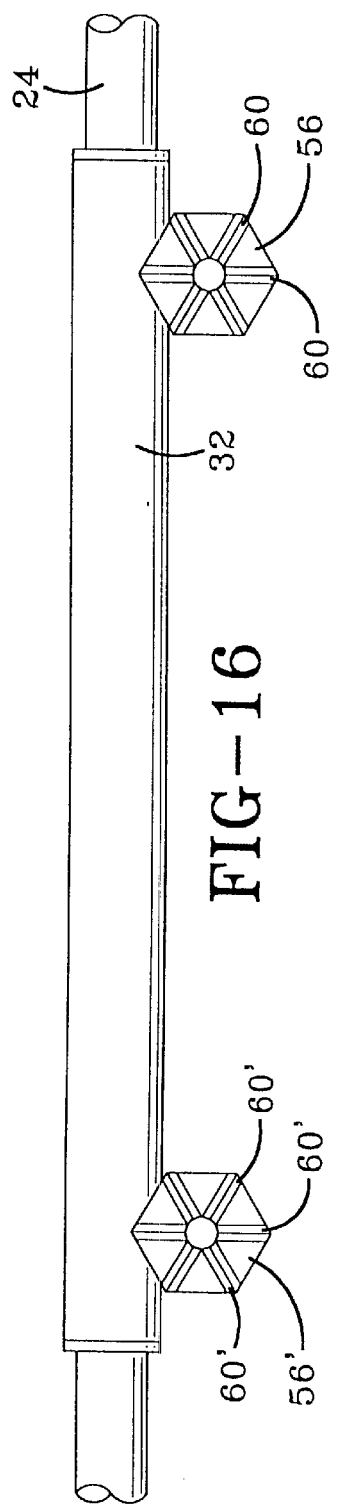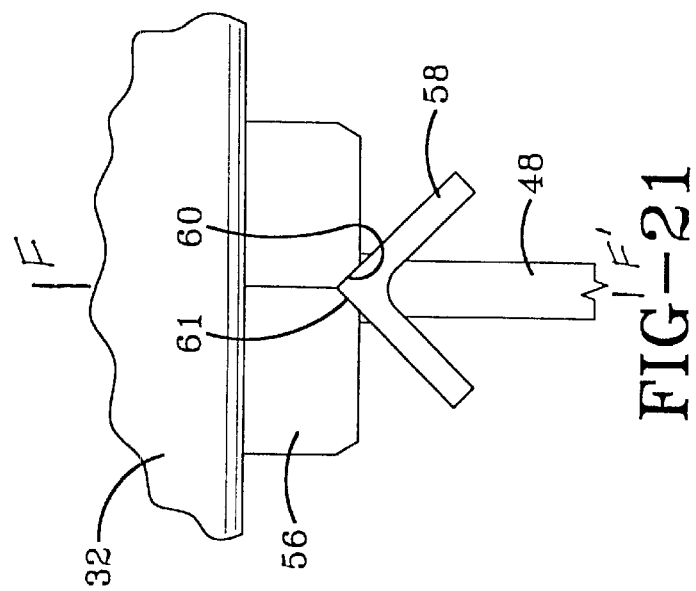

DUPLICATOR DEVICE FOR RADIAL ARM SAW

CROSS REFERENCE TO RELATED APPLICATIONS

This application claims priority from pending U.S. provisional patent application serial No. 60/247,137 filed Nov. 9, 2000; the disclosures of which are incorporated herein by reference.

BACKGROUND OF THE INVENTION

1. Technical Field

The invention relates generally to a duplicator for use in woodworking, and more particularly to a duplicator for attachment to a standard radial arm saw. Specifically, the present invention relates to a duplicator that may be attached to a standard radial arm saw while being movable and adjustable in at least five directions.

2. Background Information

Woodworkers often desire to duplicate a three dimensional object. Such objects may includes faces, patterns, sculptured items, etc. These parts could be carved individually, but it is very difficult to make them similar, let alone identical to each other. The time and skill to individually carve them also makes this option undesirable. It is therefore desirable to have a tool which can be used to make duplicate copies of an article. Such a tool would allow the woodworker to hand carve an original work and then quickly and easily duplicate the work so that the duplicates may be sold.

BRIEF SUMMARY OF THE INVENTION

The device of the present invention is a woodworking duplicator which is adapted to be attached to a standard radial arm saw. The device allows a rotating cutting tool and a stylus to be movably supported allowing the user to trace a pattern with the stylus while cutting the pattern into a work piece with the cutter.

The invention provides a duplicator that may be mounted to a radial arm saw wherein the duplicator includes elements that may be moved in five different directions. The invention also provides a duplicator having a stylus and a cutter that may be easily locked into different parallel positions so that the user of the duplicator may more easily trace the item being duplicated. The invention also provides a duplicator that supports the weight of the stylus and cutter tool.

BRIEF DESCRIPTION OF THE SEVERAL VIEWS OF THE DRAWINGS

The preferred embodiments of the invention, illustrative of the best modes in which applicant has contemplated applying the principles of the invention, are set forth in the following description and are shown in the drawings and are particularly and distinctly pointed out and set forth in the appended claims.

FIG. 15 is sectional view taken along line 15—15 of FIG. 14.

FIG. 16 is a front view of the sleeve, with the cutting tool and stylus removed to show the bushings.

FIG. 20 is a sectional view taken along line 20—20 of FIG. 17.

FIG. 21 is a view taken along line 21—21 on FIG. 20.

Similar numerals refer to similar parts throughout the specification.

DETAILED DESCRIPTION OF THE INVENTION

Figure 1:
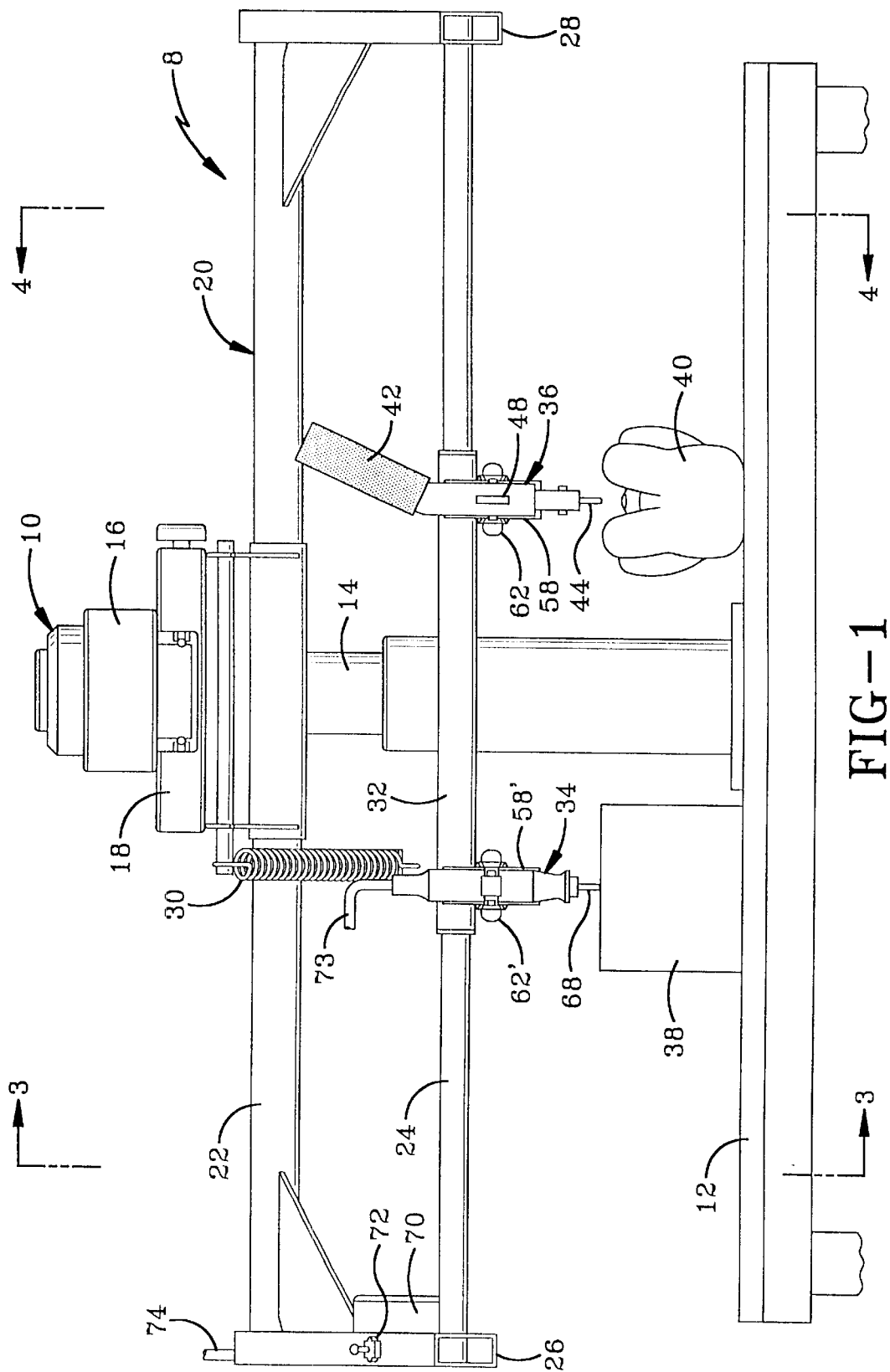
FIG. 1 is a front view of the duplicator shown mounted on a standard radial arm saw.

The duplicator device 8 of the present invention is adapted to be mounted on a radial arm saw 10. Radial arm saw 10 includes a horizontal table 12, a post 14 extending vertically therefrom, an arm 16 extending horizontally from the post 14 and over the table 12, and a slide 18 mounted on the underside of the arm 16. Post 14 is adapted to telescope so that arm 16 moves vertically towards and away from table 12. Slide 18 is adapted to move horizontally along the underside of arm 16, both towards and away from post 14.

Duplicator 8 of the present invention is adapted to be secured to radial arm saw 10 when the saw motor and blade have been removed. Duplicator 8 includes a frame that is generally indicated at 20. Frame 20 is generally rectangular in shape having first and second bars 22, 24 being disposed at right angles to end bars 26, 28. First bar 22 is attached to slide 18 of arm 16 by any suitable mounting arrangement. A spring 30 is disposed between slide 18 and first bar 22 so as to bias frame 20 upwardly towards arm 16 and away from table 12 of saw 10.

Figure 5:
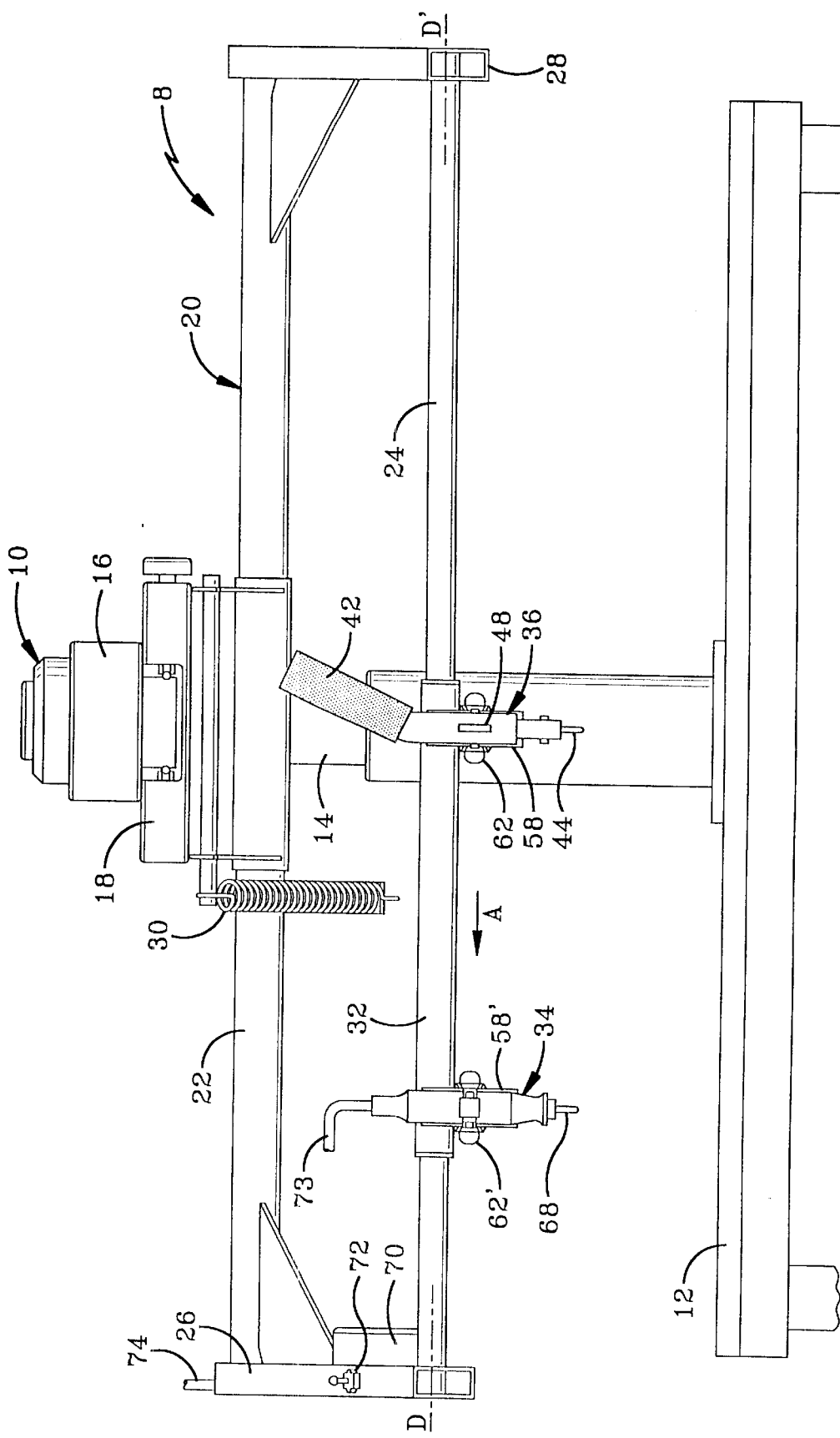
FIGS. 5 and 6 are front views of the duplicator illustrating that the sleeve holding the cutting tool and stylus may be moved in a first horizontal plane.
Figure 6:
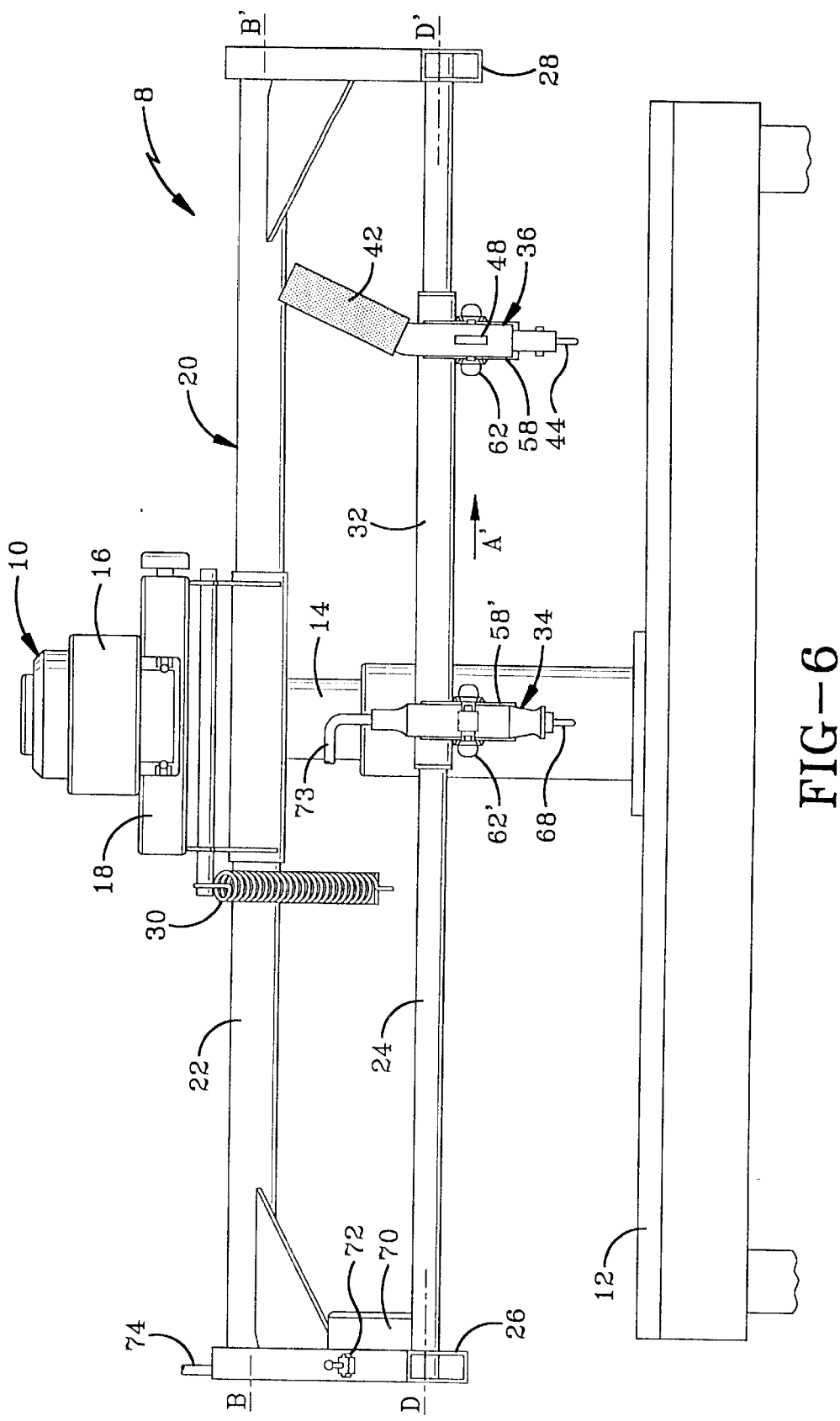

A sleeve 32 is coaxially, slidably, and rotatably disposed on second bar 24 and is adapted to move horizontally along second bar 24 between end bars 26, 28 (FIGS. 5 & 6). A cutting tool 34 and stylus 36 are mounted on sleeve 32 in any suitable manner. As sleeve 32 moves horizontally along second bar 24, cutting tool 34 and stylus 36 move with it. Cutting tool 34 and stylus 36 thus slide and rotate in concert.

Cutting tool 34 is adapted to carve into a workpiece which is typically a block of wood 38 or other substrate and stylus 36 is adapted to engage the article 40 which is to be duplicated into workpiece 38.

Figure 7:
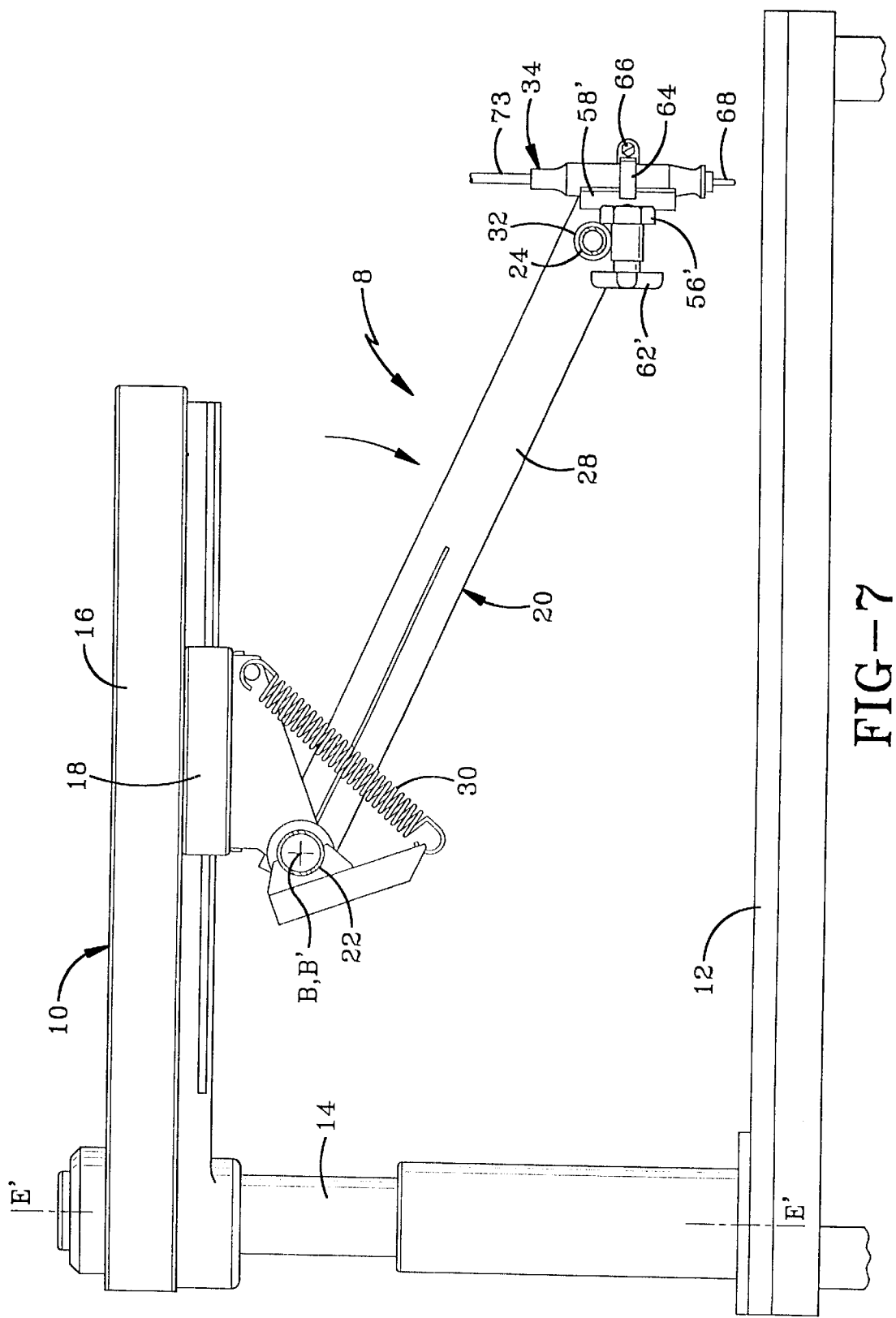
FIGS. 7 and 8 are side views of the device illustrating the vertical motion of the duplicator, showing that the cutting carriage may be lowered towards or raised away from the table of the radial arm saw.
Figure 8:
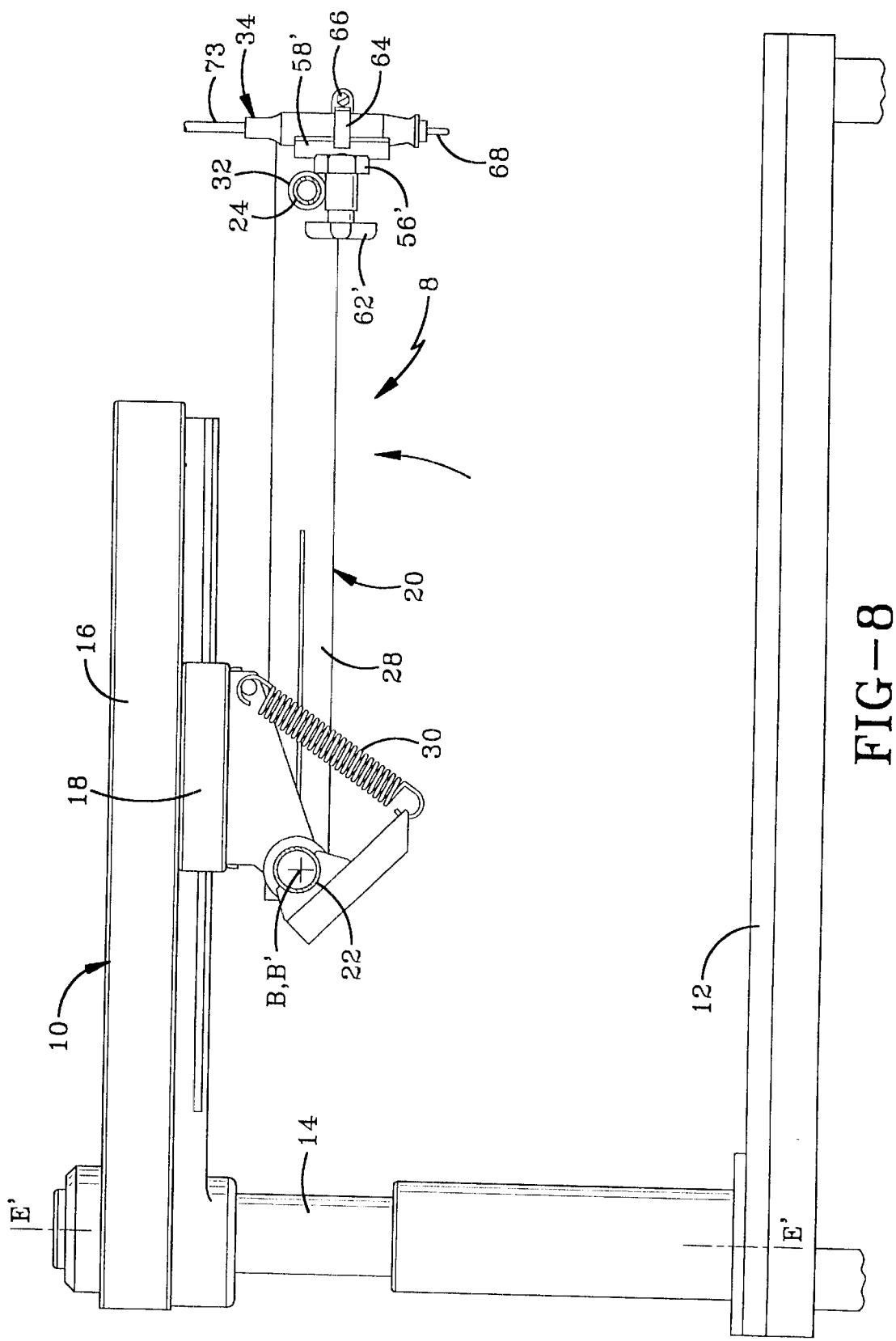
Figure 9:
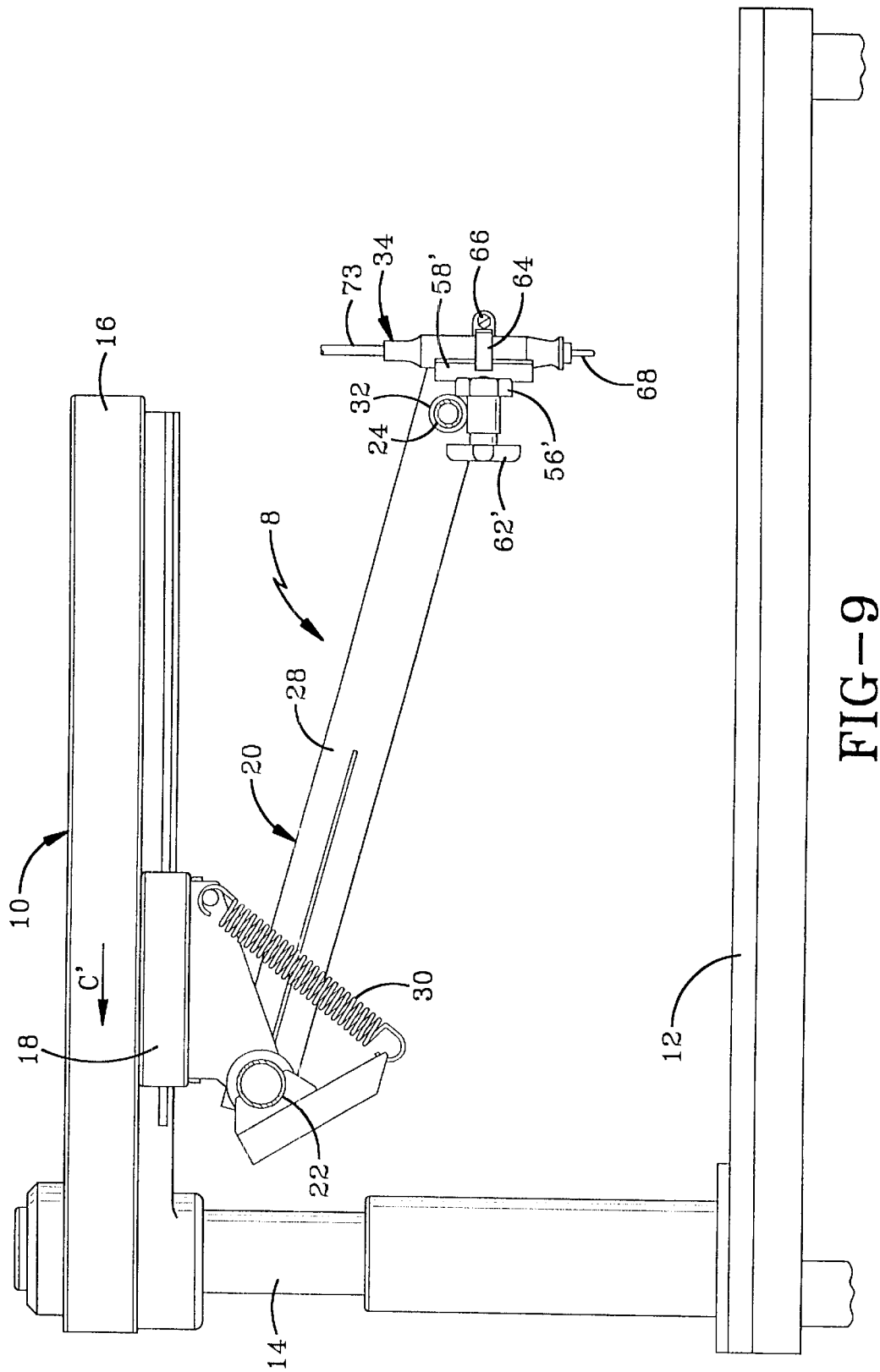
FIGS. 9 and 10 are side views of the device illustrating that the cutting carriage may be moved in a second horizontal plane toward or away from the post of the radial arm saw.
Figure 10:
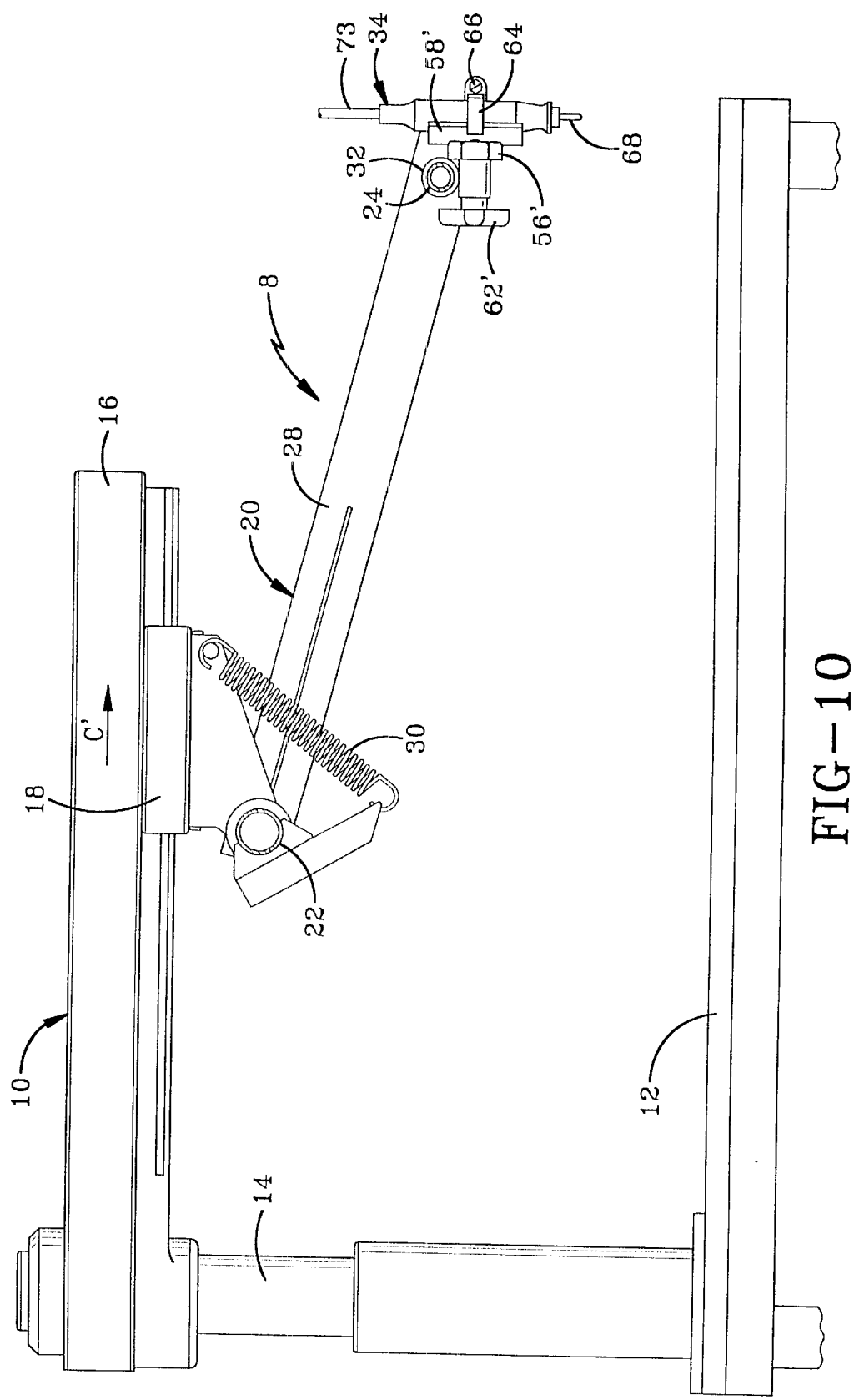
Figure 11:
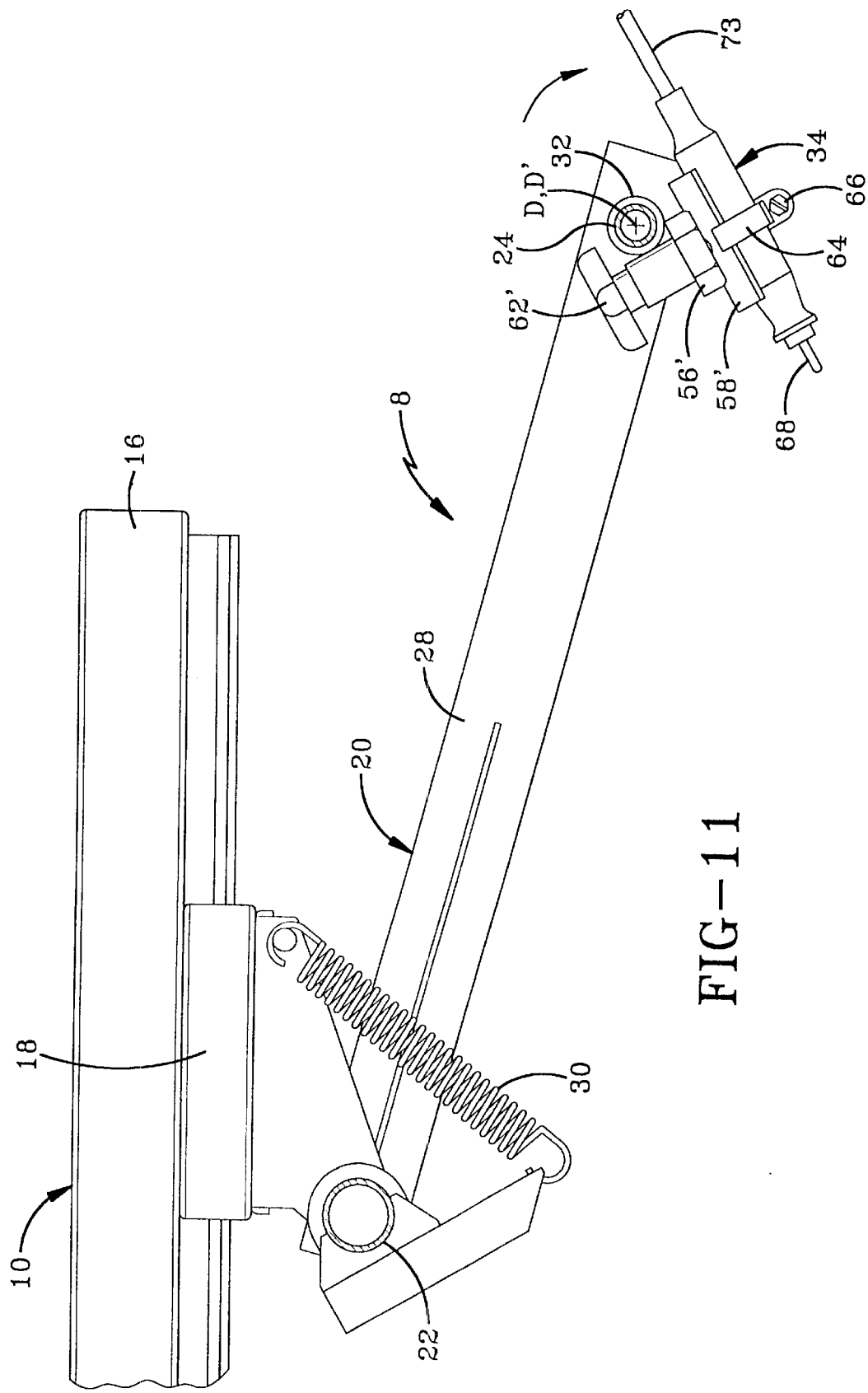
FIGS. 11 and 12 are partial side views of the device illustrating the vertical rotatability of the cutting tool of the device about the second bar of the duplicator.
Figure 12:
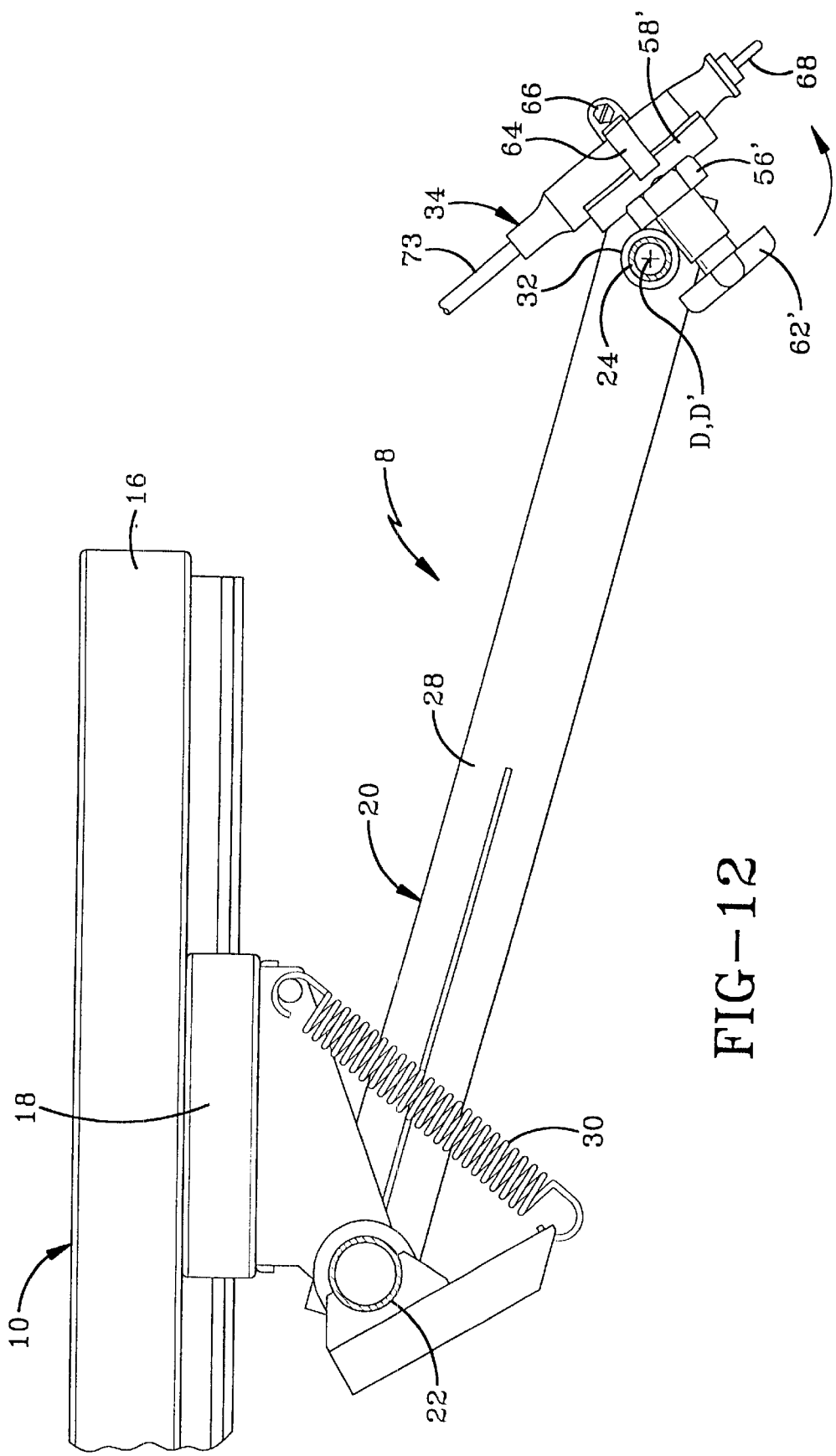
Figure 17:
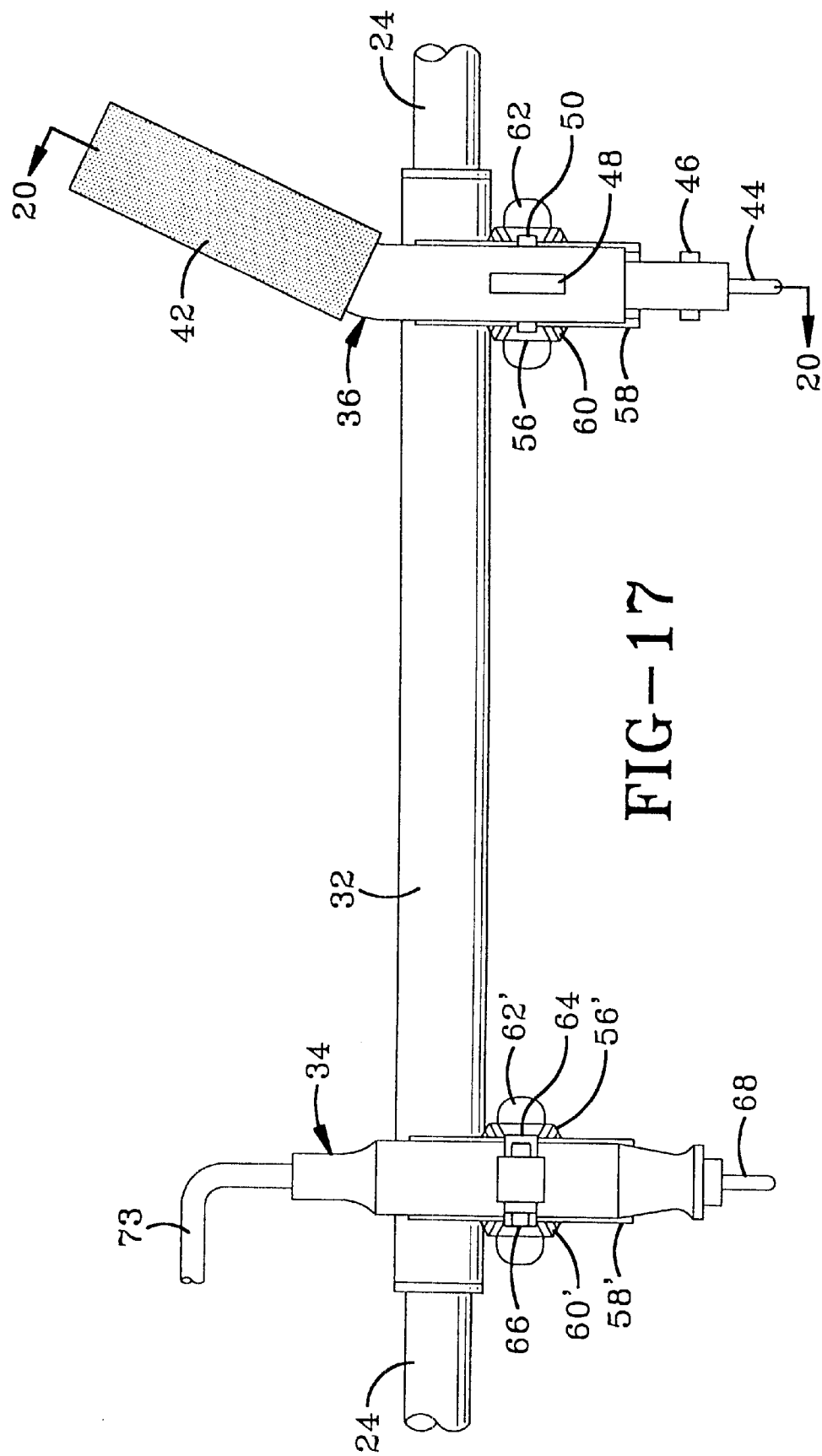
FIG. 17 is a front view of the sleeve with the cutting tool and stylus in position for engagement with the block of wood to be carved and the article to be duplicated.
Figure 18:
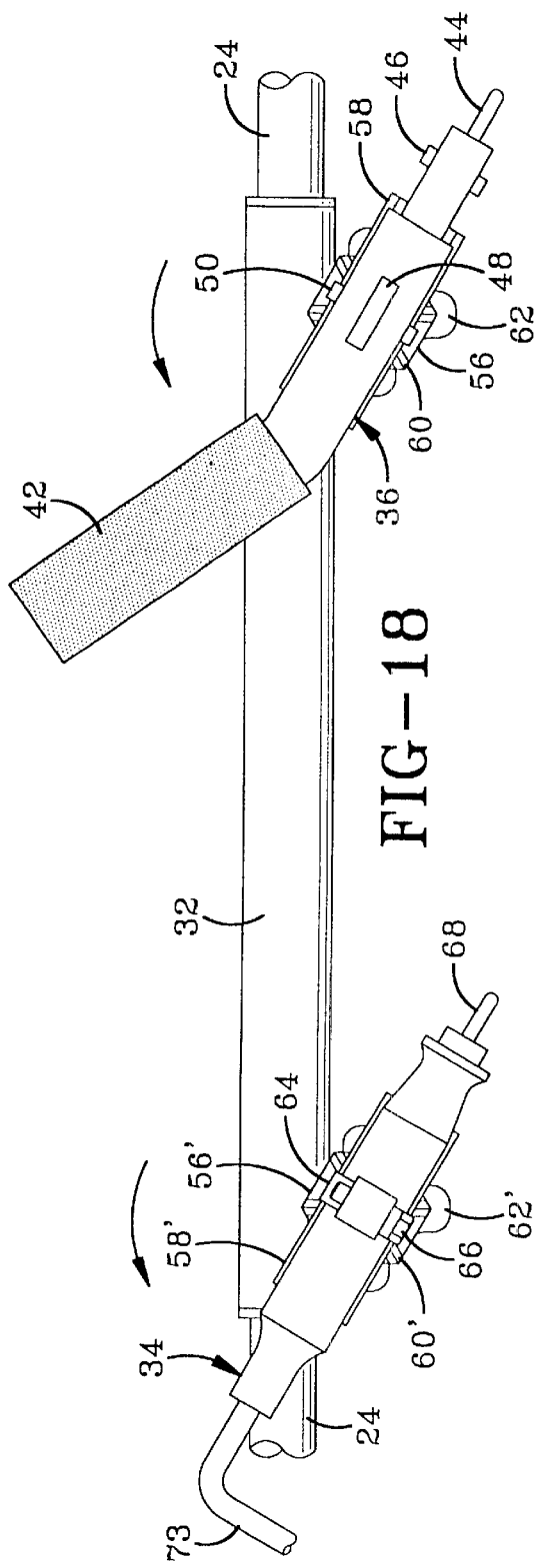
FIGS. 18 and 19 are front views of the sleeve shown in FIG. 17, illustrating the rotatability of the cutting tool and stylus relative to the sleeve.
Figure 19:
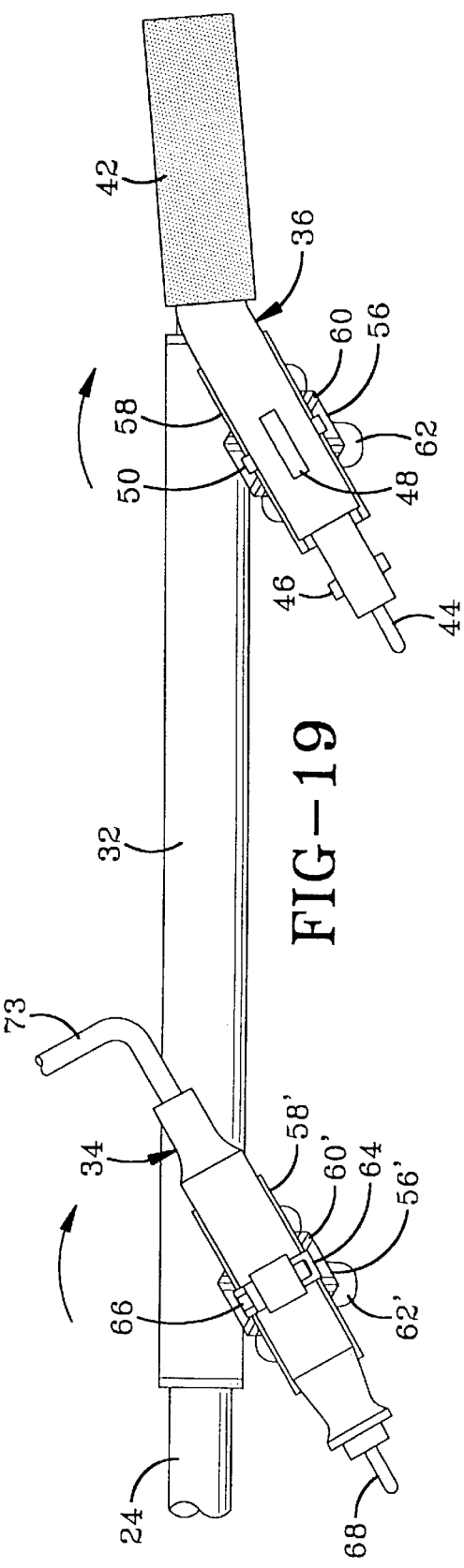

Device 8 can move in a number of directions so that cutting tool 34 can be used to cut a three dimensional copy of article 40 as stylus 36 traces over article 40. Cutting tool 34 can make the following movements. Firstly, sleeve 32 can slide horizontally in the A–A' direction along second bar 24 (FIGS. 5 & 6). This allows the cutting tool 34 to cut the block of wood 38 in a first horizontal direction. Secondly, frame 20 can rotate vertically about axis B–B' (FIG. 6). This allows the sleeve 32 to be lowered (FIG. 7) or raised (FIG. 8) relative to table 12, allowing cutting tool 34 to cut workpiece 38 in a vertical direction. Thirdly, because frame 20 is connected to slide 18, it can slide towards and away from post 14 in the C–C' direction (FIGS. 9 & 10). This moves cutting tool 34 in the second horizontal direction, thereby allowing for cuts to be made in the block of wood 38 in this direction. Fourthly, sleeve 32 is able to rotate about the axis D–D' (FIGS. 5, 11 & 12), allowing for cuts to be made in this direction. Fifthly, frame 20 can rotate about the vertical axis E–E' (FIG. 7) as arm 16 is rotated about post 14 of radial arm saw 10. Finally, as best can be seen in FIGS. 17, 18 and 19, cutting tool 34 and stylus 36 can be rotated about axes F and F' (FIGS. 20 and 21) in a manner which will be described below. The relative movements and rotatability of cutting tool 34 and stylus 36 in these various directions, allows for any three dimensional object to be duplicated by device 10.

Stylus 36 is shown in greater detail in FIGS. 15 and 20. Stylus 36 includes a handle 42 at one end and a tracing tip 44 at the other. Tracing tip 44 may be adjustably mounted to stylus 36 in any suitable manner such as being received within a slot and being clamped therein by a clamp 46. While tracing tip 44 is shown as a removable part of stylus 36, it may be formed as an integral part thereof. The body of stylus 36 includes a slot for receiving a rod 48 therethrough. A suitable clamp 50 secures rod 48 and stylus 36 together. Rod 48 has a threaded first end 52 and a second end 54 that is inserted first through the bore 55 of a bushing 56 connected to sleeve 32 then through a V-shaped bracket 58 and finally through the slot in stylus 36. Bushing 56 is connected to sleeve 32 by any suitable connectors such as welds or mechanical connectors. Clamp 50 is then inserted into stylus 36 to secure rod 48 in place.

Figure 13:
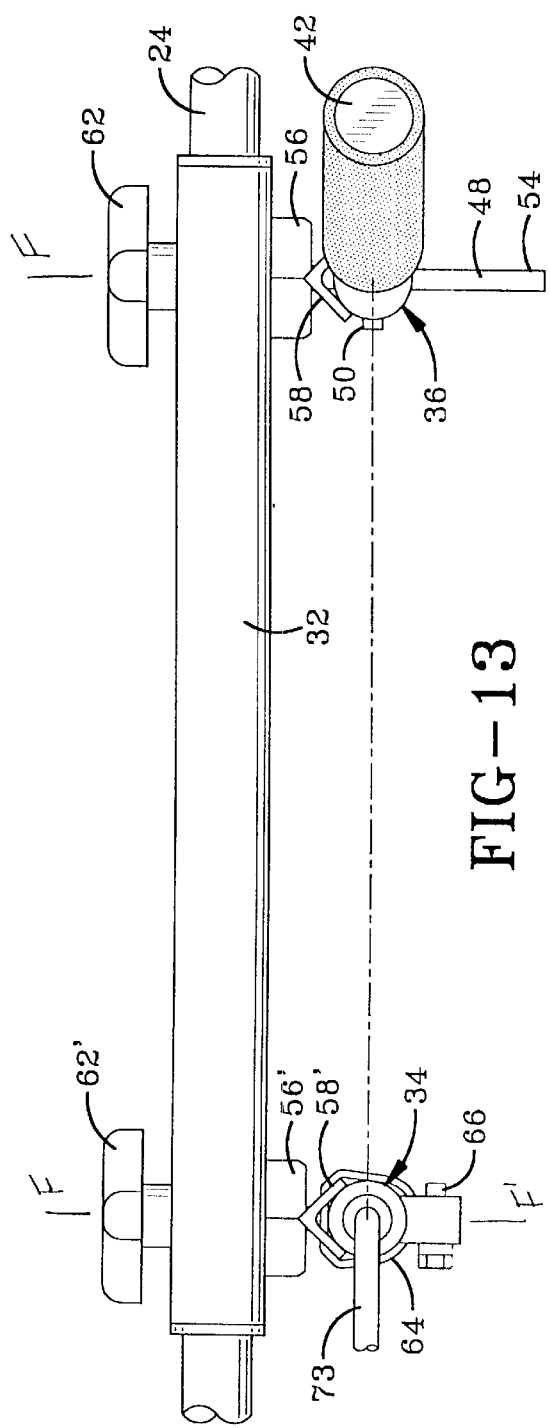
FIG. 13 is a partial plan view of the sleeve of the device showing how a first cutting tool and the stylus are mounted on the sleeve.
Figure 14:
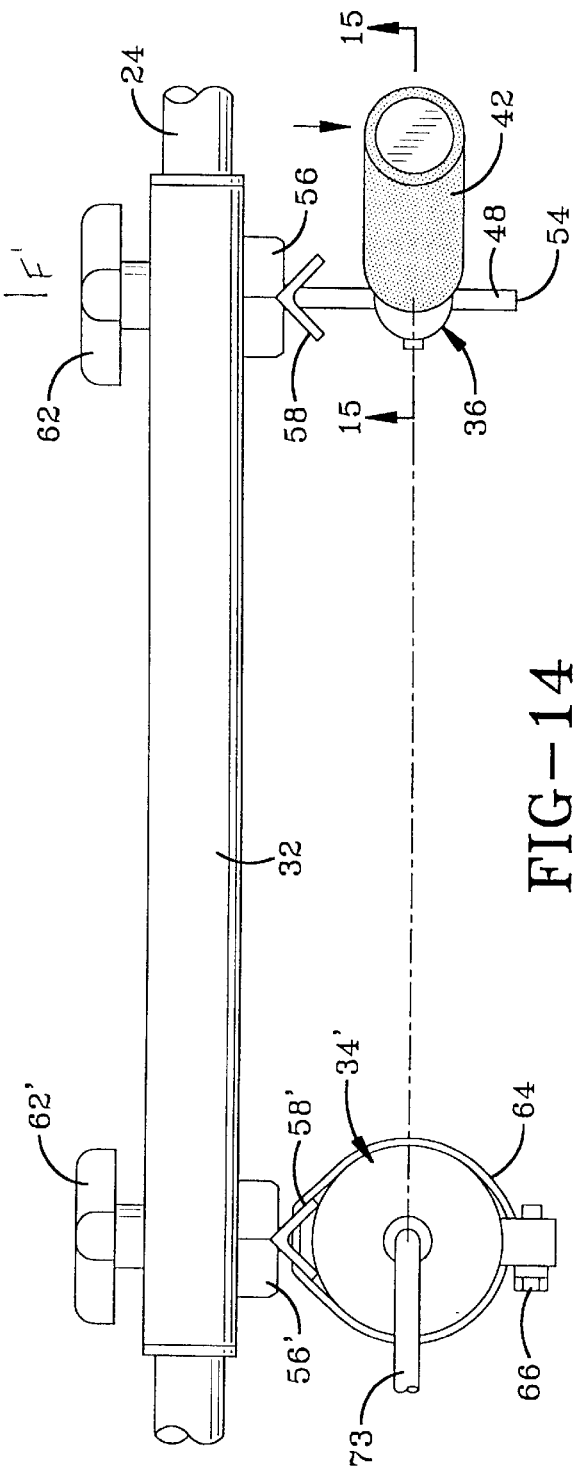
FIG. 14 is a partial plan view of the sleeve showing a second cutting tool and the stylus, and illustrating how the stylus is adjusted to align with the cutting tool on the sleeve.

As can be seen from FIGS. 16 & 21, the front face of bushing 56 which lies proximate bracket 58 is provided with a plurality of grooves 60 for receiving the apex 61 of the V of bracket 58. An internally threaded handle 62 engages the external threads on first end 52 of rod 48. When handle 62 is rotated, rod 48 is drawn farther towards or away from handle 62, thereby decreasing or increasing the distance between sleeve 32 and stylus 36 (see FIGS. 13 and 14). If it is desired to alter the angle of stylus 36 relative to sleeve 32, handle 62 is rotated to the point that apex 61 disengages from groove 60, bushing 50 is rotated so that a different groove 60 is disposed for engagement with bracket 58, and then handle 62 is rotated until apex 61 re-engages in the different groove 60.

Cutting tool 34 is connected to the sleeve 32 in the following manner. A second V-shaped bracket 58' is provided to engage in the grooves 60' of a second bushing 56' in the manner described above. Second bracket 58' is connected to an adjustable clamp 64 by a second rod (not shown). Clamp 64 may include any suitable means of securing the cutting tool within its grasp, such as an expandable band having a lock screw 66 disposed for locking the ends of the band together. A second handle 62' is provided to engage the end of the second rod to allow for release and securing of second bracket 58' in second bushing 56'. Cutting tool 34 may be any suitable device such as a rotary cutter or a hand-held router. An electrical outlet 70 and switch 72 are provided on frame 20 so that cutting tool 34 may be conveniently and safely operated. Cord 73 of cutting tool 34 may be connected to outlet 70. An electrical cord 74 connects outlet 70 to a power source (not shown).

It is desirable that tracing tip 44 of stylus 36 and cutting tip 68 of cutting tool 34 be aligned with each other so that as movements are made with stylus 36 over article 40 to be copied, the same movements are made at the same time and in the same relative position by cutting tip 68. If cutting tool 34 is exchanged for a larger tool 34' (FIGS. 13 & 14), then handle 62 can be adjusted to allow for stylus 36 to move farther away from sleeve 32. This allows the user to adjust the device so that cutting tip 68 and tracing tip 44 remain aligned.

Similarly, the angle of cutting tool 34 and stylus 36 relative to the sleeve 32 may be adjusted (FIG. 18 & 19). This is achieved by changing grooves 60 on the bushings 56, 56' with which the brackets 58, 58' engage, as previously described. It may also be desirable to sometimes cut a mirror image of an article 40. In that event brackets 58, 58' proximate stylus 36 and cutting tool 34 are engaged in grooves which face in opposing directions.

Figure 2:
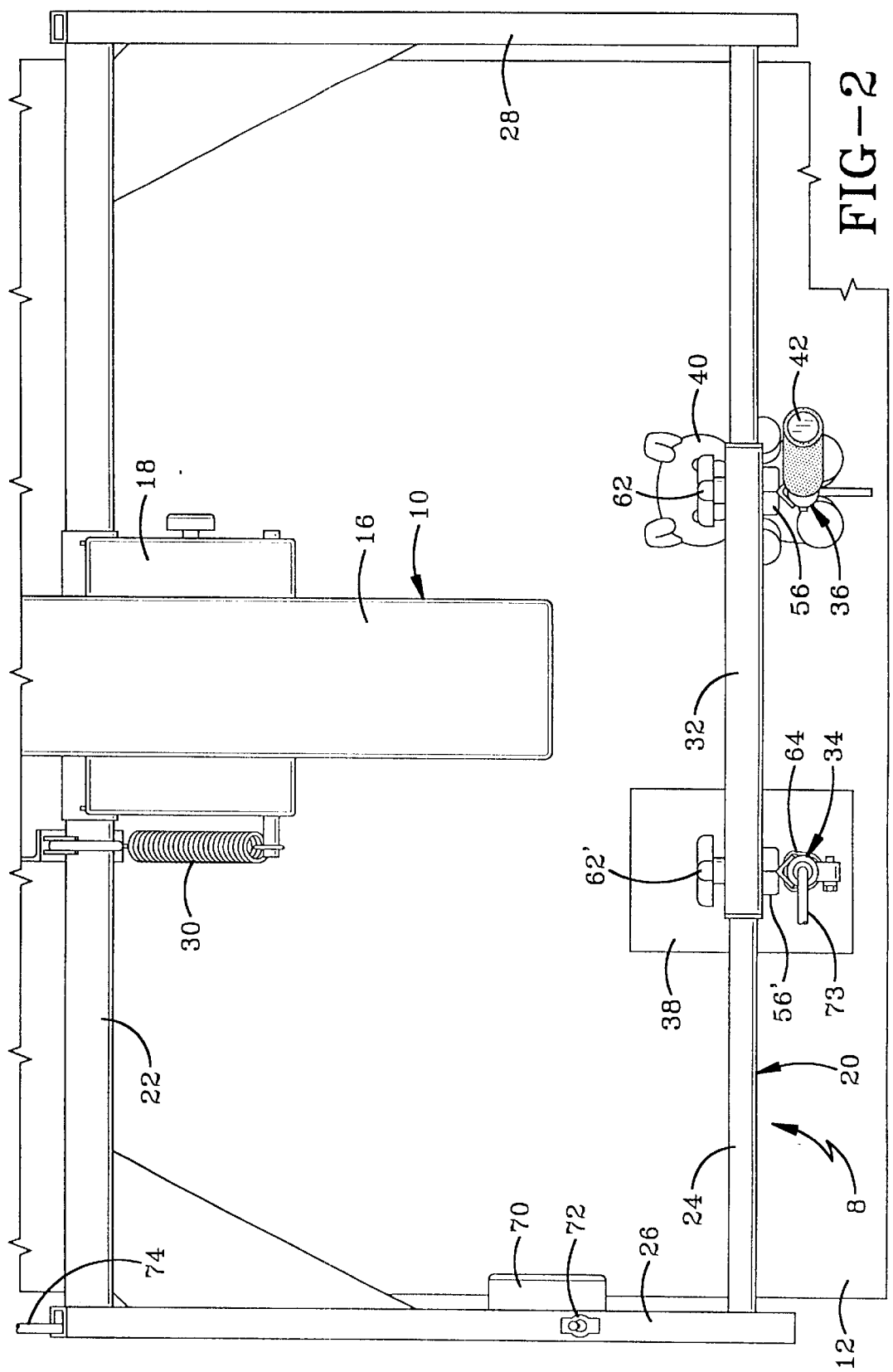
FIG. 2 is a plan view of the device shown in FIG. 1.
Figure 3:
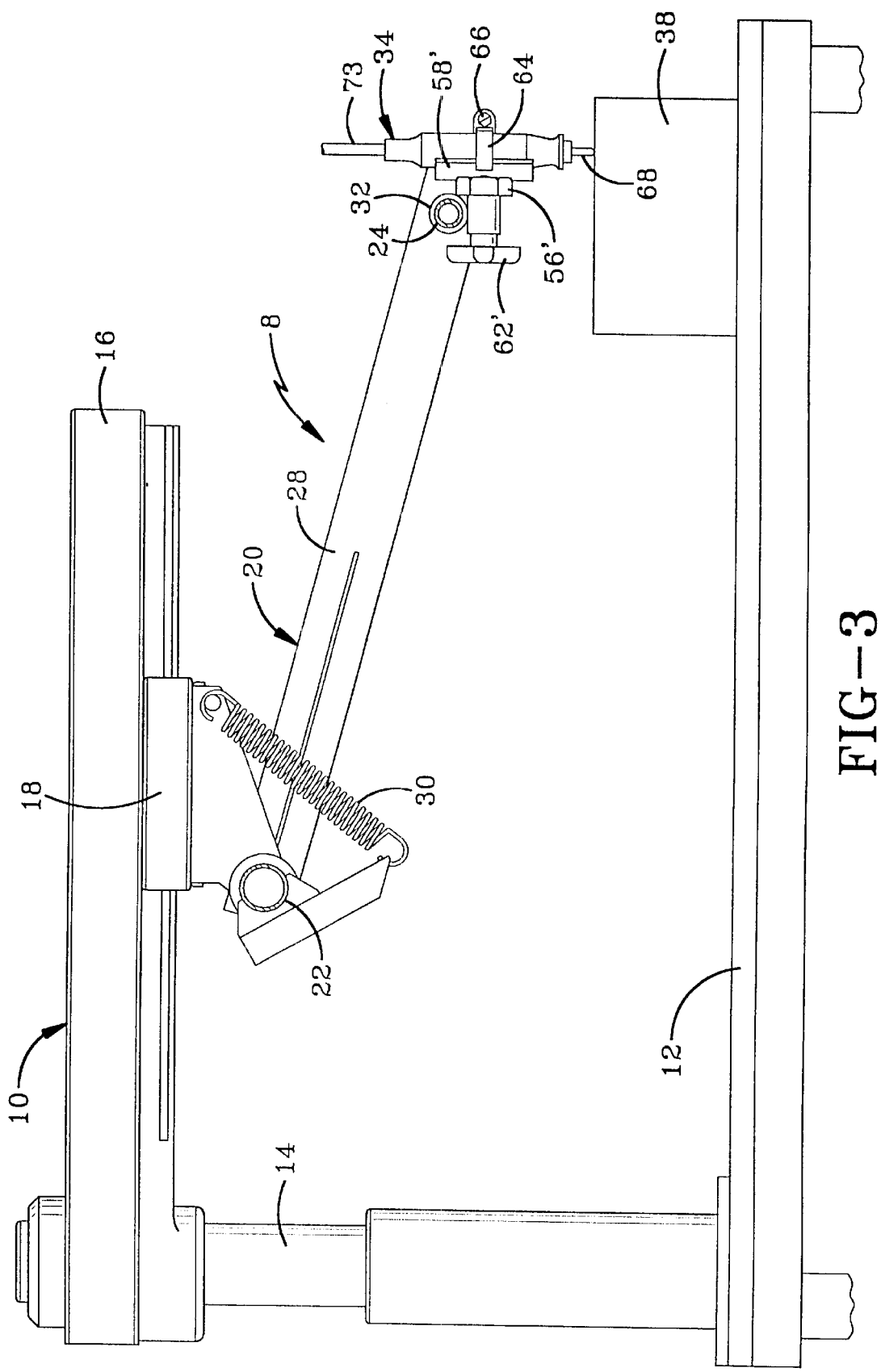
FIG. 3 is a side view of the device through line 3—3 of FIG. 1, showing the cutting tool contacting a block of wood to be carved.
Figure 4:
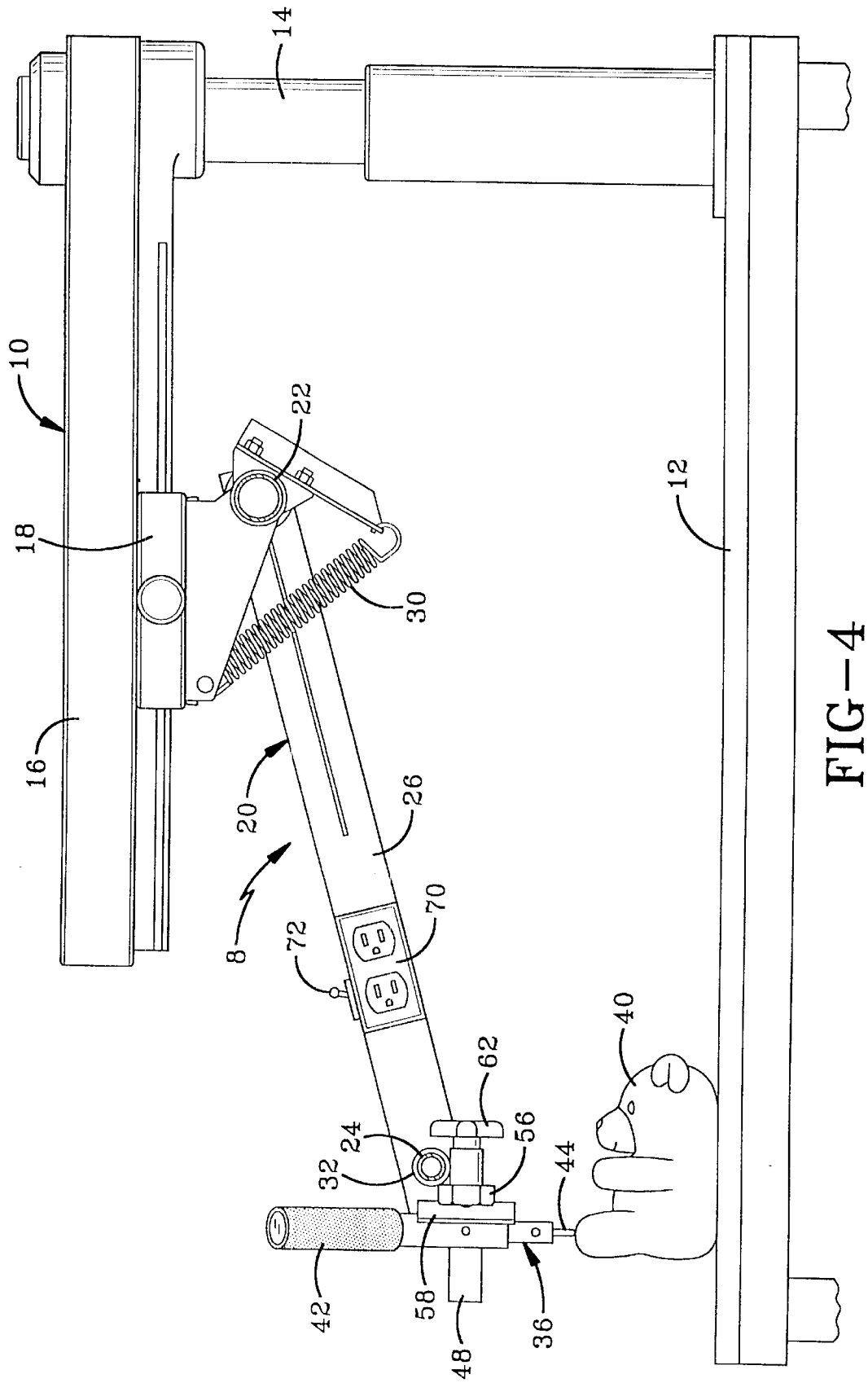
FIG. 4 is a side view of the device through line 4—4 of FIG. 1, showing the stylus contacting an article to be duplicated.

The device of the present invention is used in the following manner:

Referring to FIGS. 1 & 2, article 40 to be duplicated is secured to table 12 by any suitable means. Similarly block of wood 38 or other desired workpiece is positioned alongside article 40 and is secured to table 12 by a suitable holding mechanism. Frame 20 is pulled downwardly towards table 12 by the user grasping second bar 24, end 26, 28 or handle 42 of stylus 36. The user connects cutting tool 34 to outlet 70, and switches cutting tool 34 on. The user then manipulates stylus 36 so that tracing tip 44 traces out the shape of article 40 being duplicated. As the user does this cutting tool 34 moves in concert with stylus 36 and cutting tip 68 cuts the identical shape into block of wood 38. Adjustments are made to the angle of stylus 36 and cutting tool 34 as necessary. When block of wood 38 has been shaped into the desired article, cutting tool 34 is switched off and disconnected from outlet 70. Frame 20 is released and rises back to its at rest position (shown in FIG. 8). The duplicated article is removed from table 12 and a new block of wood 38 may then be secured to the table for the manufacture of another duplicate.

Accordingly, the improved duplicator device for a radial arm saw is simplified, provides an effective, safe, inexpensive, and efficient device which provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the duplicator device is constructed and used, the characteristics of the construction, and the advantageous new and useful results obtained; the new and useful structures, devices, elements, arrangements, parts, and combinations are set forth in the appended claims.

What is claimed is:

1. A duplicator for use with a radial arm saw having a horizontal table, a post extending vertically with respect to the table, an arm extending horizontally from the post and over the table, and a slide mounted on the underside of the arm; the duplicator comprising:
   a frame adapted to be connected to the slide;
   a sleeve carried by the frame;
   the sleeve rotatable with respect to the frame;
   the sleeve being slidable with respect to the frame;
   a stylus connected to the sleeve; and
   a cutting tool connected to the sleeve;
   the angle between the stylus and the sleeve being adjustable; the angle between the cutting tool and the sleeve being adjustable.

2. The duplicator of claim 1, further comprising a spring having first and second ends; the first end of the spring being connected to the frame; and the second end of the spring being adapted to connect with the slide; the spring being adapted to support the frame.

3. The duplicator of claim 1, wherein the frame includes first and second bars and first and second end bars; the first end bar being adapted to be connected to the slide; the sleeve being carried by the second end bar; and the first and second bars being spaced apart and connecting the first and second end bars.

4. The duplicator of claim 1, wherein the stylus is connected to the sleeve at a first location and the cutting tool is connected to the sleeve at a second location; the distance between the first and second locations being fixed.

5. The duplicator of claim 4, wherein the frame is adapted to pivot with respect to the slide.

6. The duplicator of claim 5, wherein the frame includes a pair of end bars connected by first and second bars; the sleeve being carried by one of the end bars.

7. The duplicator of claim 6, further comprising a spring having first and second ends; the first end of the spring being connected to the frame; and the second end of the spring being adapted to connect with the slide; the spring being adapted to support the frame.

8. The duplicator of claim 7, further comprising a source of electric power connected to the frame.

9. The duplicator of claim 1, wherein the stylus has a tracing tip offset a first distance from the sleeve; the cutting tool having a cutting tip offset a second distance from the sleeve; the second distance being the same as the first distance.

10. The duplication of claim 9, wherein the stylus is connected to the sleeve by a clamp that allows the offset distance of the stylus to be adjusted with respect to the sleeve.

11. The duplicator of claim 1, further comprising a bushing and a bracket associated with each of the stylus and cutting tool; the bushing defining at least two grooves adapted to receive a portion of the bracket to position the bracket in a predictable orientation with respect to the sleeve.

12. The duplicator of claim 11, wherein the bushing defines a plurality of grooves that define different positions for the bracket.

13. The duplicator of claim 12, wherein the cutting tool is held to the bracket with a strap that wraps around a portion of the cutting tool.

14. A duplicator for use with a radial arm saw having a horizontal table, a post extending vertically with respect to the table, an arm extending horizontally from the post and over the table, and a slide mounted on the underside of the arm; the duplicator comprising:
   a frame adapted to be connected to the slide; the frame pivoting with respect to the slide;
   a spring having first and second ends; the first end of the spring being connected to the frame; and the second end of the spring being adapted to connect with the slide; the spring being adapted to support the frame;
   a sleeve carried by the frame;
   the sleeve rotatable with respect to the frame;
   the sleeve being slidable with respect to the frame;
   a stylus connected to the sleeve; the stylus having a tracing tip offset a first distance from the sleeve;
   a cutting tool connected to the sleeve; the cutting tool having a cutting tip offset a second distance from the sleeve; the second distance being the same as the first distance;
   the angle between the stylus and the sleeve being adjustable;
   the angle between the cutting tool and the sleeve being adjustable; and
   a bushing and a bracket associated with each of the stylus and cutting tool; the bushing defining at least two grooves adapted to receive a portion of the bracket to position the bracket in a predictable orientation with respect to the sleeve.

15. The duplicator of claim 14, wherein the stylus and cutting tool are movable with respect to the base in five directions; two of the five directions are sliding directions that are perpendicular to each other.

16. The duplicator of claim 15, wherein the remaining three directions are rotational directions.

* * * * *